UNITED STATES PATENT OFFICE.

HERMAN SCHROEDER, OF QUINCY, ILLINOIS.

POISONOUS COMPOUND FOR RATS AND THE LIKE 1,372,092.     Specification of Letters Patent.     Patented Mar. 22, 1921.

No Drawing.     Application filed December 6, 1919. Serial No. 342,980.

*To all whom it may concern:*

Be it known that I, HERMAN SCHROEDER, a citizen of the United States, residing at Quincy, in the county of Adams and State of Illinois, have invented certain new and useful Improvements in Poisonous Compounds for Rats and the Like, of which the following is a specification.

This invention relates to an improved poisonous compound for use in connection with wheat for killing rats, gophers, moles and like animals.

Computing the upkeep of the rat at one-half cent per day, and estimating one rat to each person, the sum of one hundred and eightly million dollars per year is lost to the country by the depredations of such pests. Also it has been determined that one rat will consume fifty pounds of grain in a year, which involves considerable loss to the farmers.

Therefore, it is the aim of the present invention to provide a poisonous compound used on wheat for killing rats and like animals. It being a further aim to place a certain quantity of wheat, saturated with this improved compound in a saucer or other receptacle and place it where it is convenient to the animal to be exterminated.

Further, it is an object of the invention to compound a poisonous substance or mixture for rats, comprising arsenic trioxid, sixteen ounces, strychnin alkaloid, sixteen ounces, glacial acetic acid, 99% (sixteen minims) fluid extract gelsemium, half ounce, and fluid extract digitalis, half ounce.

In compounding this poisonous mixture, the strychnin alkaloid is first dissolved in a requisite amount of water together with the acetic acid, and subsequently add about four ounces of hot water. The arsenic trioxid is then dissolved in hot water and then the whole composition is dried by heat at a temperature of 112 degrees Fahrenheit.

The mixtures of strychnin alkaloid and hot water and the arsenic and hot water are then thoroughly mixed together, and to this compound the fluid extract gelsemium and the fluid extract digitalis are added. The entire mixture is then thoroughly agitated. The wheat or other grain is then saturated with the compound, and a requisite amount is placed in a receptacle to be arranged convenient to be reached by the rats or other animals to be exterminated.

It is obvious that the compound may be mixed in larger quantities, the ingredients being proportionately increased.

It is obvious that this compound contains certain proportions of poisonous ingredients, and furthermore, the sale of poison is always attained with great risk, therefore, when this compound is manufactured and sold, it is to be borne in mind that this compound or poisonous preparation must not be kept in places with medicine or food, so as not to contaminate the same.

The invention having been set forth, what is claimed as new and useful is:—

1. A poisonous food for vermin consisting of grain soaked in a solution formed by combining arsenic trioxid, strychnin alkaloid, glacial acetic acid, fluid extract gelsemium, and fluid extract digitalis.

2. An animal poison, consisting of grain soaked in a solution formed by first dissolving strychnin alkaloid in a requisite amount of hot water together with an acetic acid and fluid extract gelsemium including hot water and a solution formed by combining arsenic trioxid, fluid extract digitalis in hot water, in the proportions as specified.

3. An animal poison, consisting of a solution of strychnin alkaloid, a requisite amount of hot water together with acetic acid, a fluid extract of gelsemium including hot water, a solution comprising arsenic trioxid, fluid extract digitalis and hot water, and grain soaked in the combined solutions.

In testimony whereof I hereunto affix my signature.

HERMAN SCHROEDER.